United States Patent
Pandian

(10) Patent No.: US 10,592,993 B2
(45) Date of Patent: Mar. 17, 2020

(54) COMPUTERIZED TRANSACTION MANAGEMENT MODULE FOR BLOCKCHAIN NETWORKS

(71) Applicant: ORACLE FINANCIAL SERVICES SOFTWARE LIMITED, Mumbai (IN)

(72) Inventor: Mahendran Muthu Pandian, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 160 days.

(21) Appl. No.: 15/924,784

(22) Filed: Mar. 19, 2018

(65) Prior Publication Data

US 2019/0102842 A1    Apr. 4, 2019

(30) Foreign Application Priority Data

Sep. 29, 2017  (IN) .............................. 201721034642

(51) Int. Cl.
*G06F 17/30* (2006.01)
*G06Q 40/00* (2012.01)
(Continued)

(52) U.S. Cl.
CPC ............. *G06Q 40/12* (2013.12); *G06F 16/27* (2019.01); *G06Q 20/10* (2013.01); *G06Q 20/223* (2013.01);
(Continued)

(58) Field of Classification Search
CPC ...... G06Q 40/12; G06Q 20/10; G06Q 20/223; G06Q 20/35785; G06F 16/27
See application file for complete search history.

(56) References Cited

U.S. PATENT DOCUMENTS

2010/0205093 A1  8/2010  Seale, III et al.
2014/0236811 A1  8/2014  Etchegoyen
(Continued)

FOREIGN PATENT DOCUMENTS

CN   106230852 A   12/2016
CN   106504089 A   3/2017
WO   2016161073 A1  10/2016

OTHER PUBLICATIONS

Search Report in co-pending PCT Appl. No. PCT/IB2018/000368 filed Mar. 20, 2018, dated Jul. 3, 2018. (12 pgs).
(Continued)

*Primary Examiner* — Syed H Hasan
(74) *Attorney, Agent, or Firm* — Kraguljac Law Group, LLC

(57) ABSTRACT

Systems, methods, and other embodiments associated with managing transactions communicated over a blockchain network are described. In one embodiment, a method includes maintaining a static maintenance table of hard-coded properties of a first entity. The example method may also include maintaining a parent transaction table comprising columns of data that are updated less than threshold frequency. The example method may also include maintaining a child transaction table comprising columns of data that are updated greater than the threshold frequency. The example method may also include receiving a transaction to communicate over the blockchain network, and validating the transaction using the hardcoded properties. The example method may also include populating values into the parent transaction table and the child transaction table, and using such tables to facilitate the communication of the transaction over the blockchain network.

20 Claims, 9 Drawing Sheets

(51) Int. Cl.
  *G06Q 20/10* (2012.01)
  *G06Q 20/38* (2012.01)
  *G06Q 20/34* (2012.01)
  *G06Q 20/22* (2012.01)
  *G06F 16/27* (2019.01)

(52) U.S. Cl.
  CPC ....... *G06Q 20/35785* (2013.01); *G06Q 20/38* (2013.01); *G06Q 2220/00* (2013.01)

(56) References Cited

U.S. PATENT DOCUMENTS

| | | |
|---|---|---|
| 2017/0091397 A1 | 3/2017 | Shah |
| 2017/0230189 A1 | 8/2017 | Toll et al. |
| 2017/0236104 A1 | 8/2017 | Biton |
| 2018/0005186 A1* | 1/2018 | Hunn .................... G06F 16/219 |
| 2018/0158158 A1* | 6/2018 | Coogan-Pushner ... G06Q 50/18 |
| 2018/0234496 A1* | 8/2018 | Ratias ..................... H04L 67/22 |
| 2018/0268152 A1* | 9/2018 | Cuomo ................. G06F 21/645 |
| 2019/0132350 A1* | 5/2019 | Smith .................. G06F 21/577 |

OTHER PUBLICATIONS

Law Firm of Naren Thappeta, Patentability Search Report dated Sep. 12, 2017, pp. 1-9, Bangalore, IN.
ICICI Bank, ICICI Bank executes India's first banking transactions on blockchain in partnership with Emerates; pp. 1-2, Oct. 12, 2016; downloaded from: https://www.icicibank.com/aboutus/article.page?identifier=news-icici-bank-executes-indias-first-banking-transactions-on-blockchain-in-partnership-with-emirates-nbd-20161210162515562.
HCL Technologies, An Introduction to the CoTrust Platform: HCL's Blockchain Application Platform; pp. 1-6, Sep. 12, 2017; dlwnloaded from: https://www.hcltech.com/blogs/introduction-cotrust-platformsm-hcl-blockchain-application-platform.
unchain.io, Integrate applications with blockchain networks; pp. 1-7, 2017; downloaded from: http://www.unchain.io/#home.

* cited by examiner

STATIC MAINTENANCE TABLE — 125

| BANK IDS | BANK CODES | PROXIES | HOSTNAME | HYPERLEDGER BEING USED | REST URLS |
|---|---|---|---|---|---|
| | | | | | |

PARENT TRANSACTION TABLE — 130

| COLUMNS OF INFREQUENTLY UPDATED DATA | STATUS | TRANSACTION DESTINATION | TRANSACTION SOURCE | RESPONSE DATA | NOTIFY SENDER/ RECEIVER |
|---|---|---|---|---|---|
| | | | | | |

CHILD TRANSACTION TABLE — 135

| COLUMNS OF INFREQUENTLY UPDATED DATA | STATUS | TRANSACTION DESTINATION | TRANSACTION SOURCE | RESPONSE DATA | NOTIFY SENDER/ RECEIVER |
|---|---|---|---|---|---|
| | | | | | |

FIG. 1B

COMPUTERIZED TRANSACTION MANAGEMENT MODULE FOR BLOCKCHAIN NETWORKS

CROSS REFERENCE TO RELATED APPLICATIONS

This disclosure claims the benefit of India Provisional Patent Application serial number "201721034642" filed Sep. 29, 2017, titled "Computerized Transaction Management Module for Blockchain Networks", inventors: Mahendran Muthu Pandian, and assigned to the present assignee, wherein the provisional patent application is hereby incorporated by reference in its entirety.

BACKGROUND

Many entities utilize computers to communicate data over networks. A first bank can transmit a transaction to a second bank to perform a bank transaction such as to transfer money to the second bank. One type of network that can be used to facilitate secure online transactions is a blockchain network. The blockchain network is a decentralized and distributed digital ledger used to record transactions across a plurality of computers so that records cannot be altered retroactively without alteration of all subsequent blocks and the collusion of the blockchain network. This allows participants to verify and audit transactions inexpensively. In this way, the blockchain network provides a high degree of data security.

There are many blockchain network providers that can be used by entities. Each entity can have its own implementation of how to access and use the blockchain network, such as different business use cases for using the blockchain network. Thus, a custom application must be written and tailored to a particular blockchain network provider according to how that blockchain provider implements a blockchain network. The application must also be customized to how the entity will implement the access and use of the blockchain network. Creating, storing, and maintaining custom code for each business use case and block chain provider is inefficient and wastes substantial amounts of computing resources.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 1B illustrates an embodiment of a static maintenance table, a parent transaction table, and a child transaction table.

DETAILED DESCRIPTION

Computerized systems and methods are described herein that manage transactions communicated over a blockchain network. A transaction management module, such as a hyperledger component with chain code, is configurable to connect to and communicate over various types of blockchain networks and/or future implementations of blockchain networks. Because each blockchain provider can provide their own implementation of a blockchain network that can differ from implementations by other blockchain providers, the transaction management module provides an extensible mechanism for connecting to current and future implementations of blockchain networks. In this way, a substantial amount of computing and storage resources can be conserved because custom programming code does not have to written, stored, and executed for each type of blockchain network.

The transaction management module is also configurable to connect to and communicate with various types of applications that are to communicate over the blockchain network. Thus, the transaction management module can facilitate the implementation of various types of business use cases without the need to create custom programming code for each use case. In this way, the transaction management module can facilitate the routing of messages, such as transactions, between applications hosted by different computing devices.

Figure 1A:
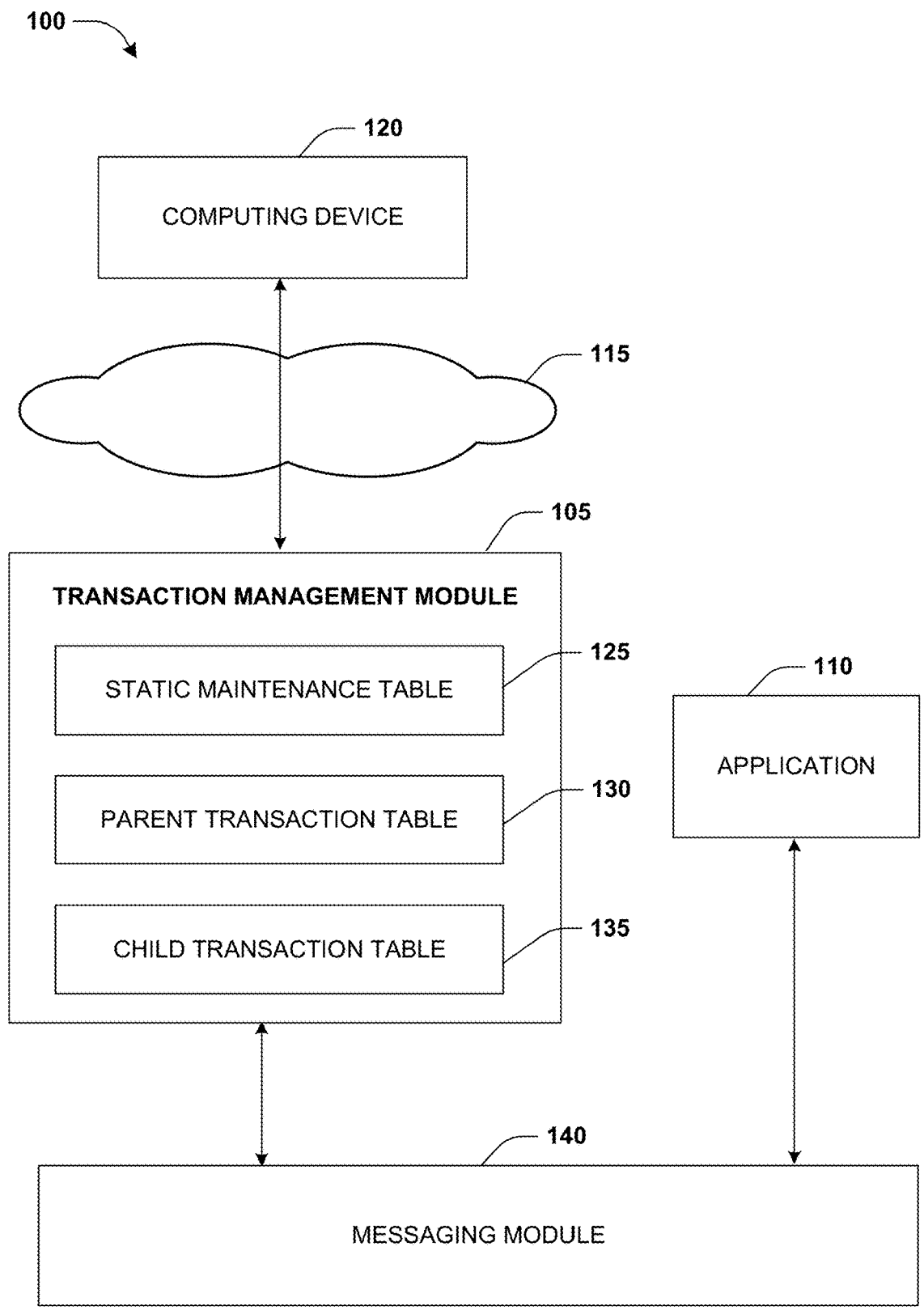
FIG. 1A illustrates an embodiment of a system associated with managing transactions communicated over a blockchain network.

With reference to FIG. 1A, one embodiment of a computer system 100 associated with managing transactions communicated over a blockchain network 115 is illustrated. The computer system 100 includes a transaction management module 105, which can be configured to execute on a computer, such as computer 515 of FIG. 5. The transaction management module 105 is configured to facilitate the transmission of messages for various use cases between various types of applications over various types of blockchain networks. In one embodiment, the transaction management module 105 is configured to provide communication over the blockchain network 115 between a first bank application of a first bank and a second bank application of a second bank, such as to facilitate transactions between the first bank and the second bank. It may be appreciated that in some examples, the terms transaction and message can be used interchangeably to refer to communication between two entities or computing devices over a blockchain network.

The transaction management module 105 can utilize a table object file to create a static maintenance table 125, a parent transaction table 130, a child transaction table 135, and/or other tables utilized for routing transactions over the blockchain network 115. In one embodiment, the table object file comprises a table json file or a file with some other data format such as XML. The table object file comprises data that can be used to create tables in a database. The table object file can comprise a structure format for the tables that will store transaction data, such as a structure format defining particular tables, columns, rows, expected data types, etc. In this way, table structure information within the table object file is used to create the tables.

The transaction management module 105 maintains the static maintenance table 125 to store hardcoded properties of a first entity. In one embodiment where the first entity is a bank, the hardcoded properties comprise bank codes, proxies, business logic of the bank to process transactions (e.g., logic to handle the transfer of money to/from the bank), bank identifiers, etc. The transaction management module 105 ensures that bank properties are hardcoded, maintained properly, updated when required, and called upon when needed. In one embodiment, the hardcoded properties comprise a host name of a server/service of the bank, a proxy, an entity identifier such as a bank code of the bank, and/or a representational state transfer (REST) uniform resource locator (URL) of where a financial bank adaptor is functioning. The transaction management module 105 is configured to execution functionality to add hardcoded properties, update hardcoded properties, disable hardcoded properties, and/or enable hardcoded properties.

In another embodiment, the static maintenance table 125 comprises one or more of a bank identifier column, a bank codes column, a proxies column, a hostname column, a hyperledger column, and a REST URL column, as illustrated in FIG. 1B. A bank name or other bank identifier is populated within the bank identifier column. An international bank code (a Society for Worldwide Interbank Financial Telecommunication (SWIFT) code or bank Identification Code (BIC)) that identifies a bank worldwide is populated within the bank codes column. Properties of proxies and/or other system and functionality related utilities are populated within the proxies column. A hostname of a bank server/service is populated within the hostname column. A hyperledger being used by the bank is populated within the hyperledger column. The hyperledger is used by the bank to record transactions of the bank. The REST URL of the bank, such as a URL of a RESTful web service of the bank, is stored in the REST URL column.

The transaction management module 105 maintains the parent transaction table 130 to comprise columns of data that are updated less than a threshold frequency, such as infrequently updated bank data. The parent transaction table 130 comprises a primary parent key of the parent transaction table 130 (e.g., corresponding to an initial transaction identifier of an initial transaction) and a primary child key of the child transaction table 135 (e.g., corresponding to a current transaction identifier of a current transaction).

In one embodiment, the parent transaction table 130 comprises one or more columns of infrequently updated bank and transaction data, a status column, a transaction destination column, a transaction source column, response data columns, and notify sender/receiver columns, as illustrated in FIG. 1B. Each row of the parent transaction table 130 can correspond to a particular transaction. A status of a transaction is populated within the status column, such as unprocessed (e.g., when a transaction first enters the hyperledger), ready to process, and/or other stages of processing the transaction. A destination bank of the transaction is populated within the transaction destination column, and a source bank of the transaction is populated within the transaction source column. Response data columns are used to store information that is regularly exchanged between the source bank and the destination bank based upon the various stages of processing the transaction. Boolean values indicating whether short transaction messages are to be sent to the source bank (sender) and the destination bank (receiver) are stored within the notify sender/receive columns.

The transaction management module 105 maintains the child transaction table 135 to comprise columns of data that are updated greater than the threshold frequency, such as frequently updated bank data. The child transaction table 135 comprises the primary parent key, the primary child key, and a name of the parent transaction table 130. In one embodiment, the child transaction table 135 comprises one or more columns of frequently updated bank and transaction data, a status column, a transaction destination column, a transaction source column, response data columns, and notify sender/receiver columns, as illustrated in FIG. 1B. Each row of the child transaction table 135 can correspond to a particular transaction. A status of a transaction is populated within the status column, such as unprocessed, ready to process, and/or other stages of processing the transaction. A destination bank of the transaction is populated within the transaction destination column, and a source bank of the transaction is populated within the transaction source column. Response data columns are used to store information that is regularly exchanged between the source bank and the destination bank based upon the various stages of processing the transaction. Boolean values indicating whether short transaction messages are to be sent to the source bank (sender) and the destination bank (receiver) are stored within the notify sender/receive columns.

The transaction management module 105 receives a transaction to communicate between a first computing device and a second computing device over the blockchain network 115. In one embodiment, the transaction was created by the application 110. The application 110 sends the transaction to the messaging module 140. The transaction is then sent from the messaging module 140 to the transaction management module 105 for transmission over the blockchain network 115 to a computing device 120. In another embodiment, the transaction is received by the transaction management module 105 over the blockchain network 115 from the computing device 120. The transaction is routed from the transaction management module 105 to the messaging module 140 for processing and delivery to the application 110.

The transaction management module 105 validates the transaction using the hardcoded properties within the static maintenance table 125. In one embodiment, the hardcoded properties are used to determine whether a source bank code and a destination bank code are valid, whether the transaction has the proper security and authentication, etc. In one embodiment, a bank code (or bank identifier) of a transaction is validated by first determining whether the bank code belongs to a list of maintained source codes. Next, a determination is made as to whether the bank code belongs to a list of maintained destination codes. Finally, a determination is made to ensure that the source bank code and the destination bank codes are not the same. Once validated, the transaction is added into the parent transaction table 130 and/or the child transaction table 135 by populating the tables with values in the same order as arguments of the transaction.

The transaction management module 105 is configured to populate values into columns of the parent transaction table 130 and/or the child transaction table 135 according to an order of arguments of the transaction. The transaction management module 105 may store a transaction identifier of the transaction as the primary parent key based upon the transaction being an initial transaction. If the transaction is a current transaction, then the transaction management module 105 may store the transaction identifier as the primary child key. The transaction management module 105 may populate the tables with a status column used to store a status of the transaction. The status can change based upon a current stage of processing the transaction such as unprocessed, ready to process, etc. The transaction management module 105 can populate the tables with a destination entity column used to track destinations of transactions (e.g., destination bank names and/or codes) and a source entity column used to track sources of the transactions (e.g., source bank names and/or codes). The transaction management module 105 can populate the tables with a response column used to store information that is routinely exchanged between a source and destination based on various stages of processing transactions, such as information that is accessed, processed, transmitted, etc. greater than a threshold frequency. The transaction management module 105 can populate the tables with a notify sender variable, such as a Boolean value, indicating whether a short message with updated values from the transaction is to be sent to the source.

In one embodiment of adding the transaction, the transaction management module 105 adds the transaction into the tables by validating bank identifiers and/or bank codes of the transaction with the hardcoded properties within the static maintenance table 125. In one embodiment, a determination is made as to whether one of the bank codes of the transaction is within a list of maintained source bank codes, if another of the bank codes of the transaction is within a list of maintained destination bank codes, and/or whether source and destination bank codes are different. After validation, the transaction is added by adding parent and child key columns into the parent transaction table 130, such as by adding the parent and child key columns as the first two columns within the parent transaction table 130. The parent transaction table 130 is iterated through by entering values of the transaction into the parent transaction table 130 in a same order as arguments of the transaction. Next, the child and parent keys, such as the primary child key and the primary parent key, are each added into the child transaction table 135, such as being added as the first two columns in the child transaction table 135. The child transaction table 135 is iterated through by entering values of the transaction into the child transaction table 135 in a same order as arguments of the transaction.

In one embodiment of updating the transaction, an update is validated by verifying a number of arguments of the update by iterating through the table object file used to create the tables to identify a number of columns in the tables to update. The transaction is updated by iterating through targeted tables by entering values from the update in a same order as arguments of the update. A child key, such as the primary child key, is updated in the child transaction table 135 and the parent transaction table 130.

In one embodiment of querying the transaction, the transaction management module 105 queries the transaction using the concept of the primary child key and the primary parent key. The transaction is queried by fetching columns from the child transaction table 135 using the primary child key that is equal to a current transaction identifier. This provides data of columns that are frequently updated. The primary child key as the current transaction identifier is used to find the primary parent key that can be used to query the parent transaction table 130 for data within less frequently updated columns. In this way, the primary parent key and the primary child key are used to complete the query for the transaction. A result of the query may comprise a string, such as in a json format with comma separated entries.

In one embodiment of error handling, an array list of failed transactions are maintained. In response to a threshold amount of time occurring since a last transaction communication attempt was performed for a failed transaction within the array list, an attempt to transmit the failed transaction across the blockchain network 115 is attempted again (e.g., performance of an HTTP post). If success then, the failed transaction is removed from the array list.

In one embodiment of event listening, a call to invoke a function may trigger an event listener. A primary parent key as a parent transaction identifier is used to fetch a corresponding transaction. The parent transaction identifier is used to query entity information to identify a source entity and a destination entity, such as a source bank and a destination bank of the transaction. If an identifier of the source or destination entities match an identifier of the application 110, then the calls is processed, otherwise the call is ignored because it relates to a different entity accessible over the blockchain network 115. Boolean variables of notify sender and notify receiver can be checked to determine how to format messages of the transaction and what messages to send to the source entity and the destination entity. If the transaction is an insert transaction, then a destination entity gets a full message regardless of a value of the notify receiver (e.g., a message regarding the entire transaction). The source entity is sent a short message if notify sender is true, otherwise no message is sent. If the transaction is an update transaction, then the destination entity gets a short message if the notify receiver is true (e.g., a message regarding updates to the transaction), otherwise no message is sent. The destination entity gets a short message if the notify sender is true, otherwise no message is sent.

The transaction management module 105 utilizes the parent transaction table 130 and/or the child transaction table 135 to facilitate the communication of the transaction over the blockchain network 115 to the destination, such as to the computing device 120. In one embodiment, the static maintenance table 125 is queried to identify a set of hardcoded properties used to communicate with the destination over the blockchain network 115. The set of hardcoded properties are used to transmit the transaction over the blockchain network 115. The set of hardcoded properties could specify a communication mechanism to use. In one embodiment, the communication mechanism comprises a query change notification mechanism for communicating notifications of messages through a database. In another embodiment, the communication mechanism comprises a queue mechanism to communicate messages through a queue. In another embodiment, the communication mechanism comprises tabling polling mechanism to pull messages from a message table. In another embodiment, the communication mechanism comprises a hypertext transfer protocol (HTTP) representation state transfer (REST) mechanism for receiving messages from a RESTful server. In another embodiment, the communication mechanism comprises socket mechanism to receive messages. In another embodiment, the communication mechanism comprises a simple object access protocol (SOAP) mechanism for communication.

In one embodiment, a request for the transaction is received by the transaction management module 105. The child transaction table 135 is queried by the transaction management module 105 using the child primary key to access data of the transaction and the parent primary key. The child primary key may comprise a current transaction identifier of the transaction. The transaction management module 105 queries the parent transaction table 130 using the parent primary key to access data of the transaction.

In one embodiment, an instruction to update the transaction is received by the transaction management module 105. Accordingly, the transaction management module 105 executes a function to update the transaction. In particular, a number of arguments of the update are validated by iterating through the table object file to determine a number of columns within the parent transaction table 130 and/or the child transaction table 135. In response to validating the number of arguments as corresponding to the number of columns, the update is implemented by iterating through the parent transaction table 130 and/or the child transaction table 135 to insert values of the update according to an order of the arguments.

Figure 2:
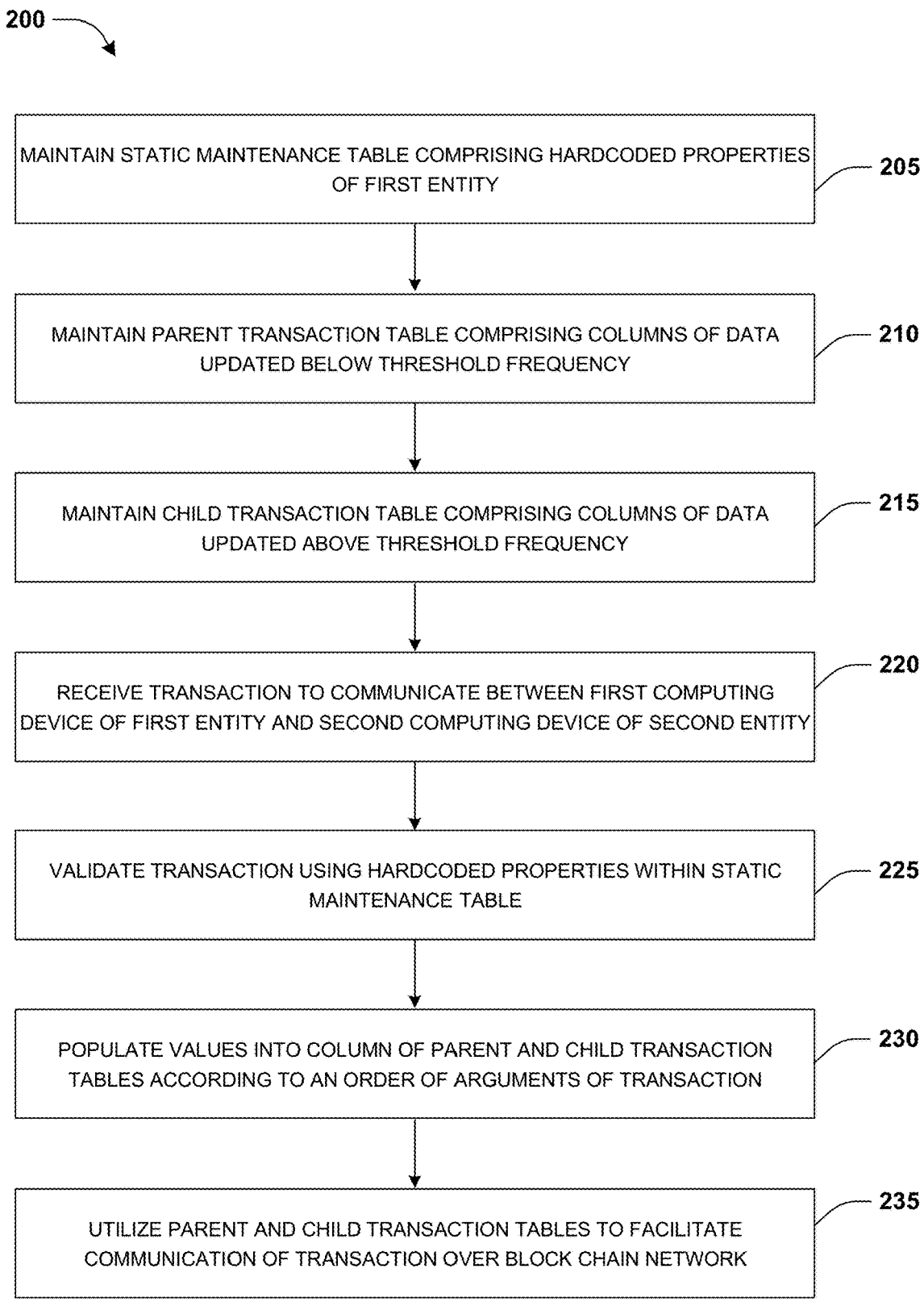
FIG. 2 illustrates an embodiment of a method associated with managing transactions communicated over a blockchain network.

With reference to FIG. 2, one embodiment of a computer implemented method 200 associated with managing transactions communicated over a blockchain network is illustrated. In one embodiment, the method 200 is performed by the transaction management module 105 utilizing various computing resources of the computer 515, such as the processor 520 for executing instructions associated with receiving, storing, processing, and/or transmitting transactions. Memory 535 and/or disks 555 are used for storing transaction data, the static maintenance table 125, the parent transaction table 130, the child transaction table 135, etc. Network hardware is used for communicating data structures and/or other data between the computer 515 and remote computers over a network, such as a blockchain network. The method 200 is triggered upon receiving a request to store, process, and/or transmit a transaction.

Figure 3A:
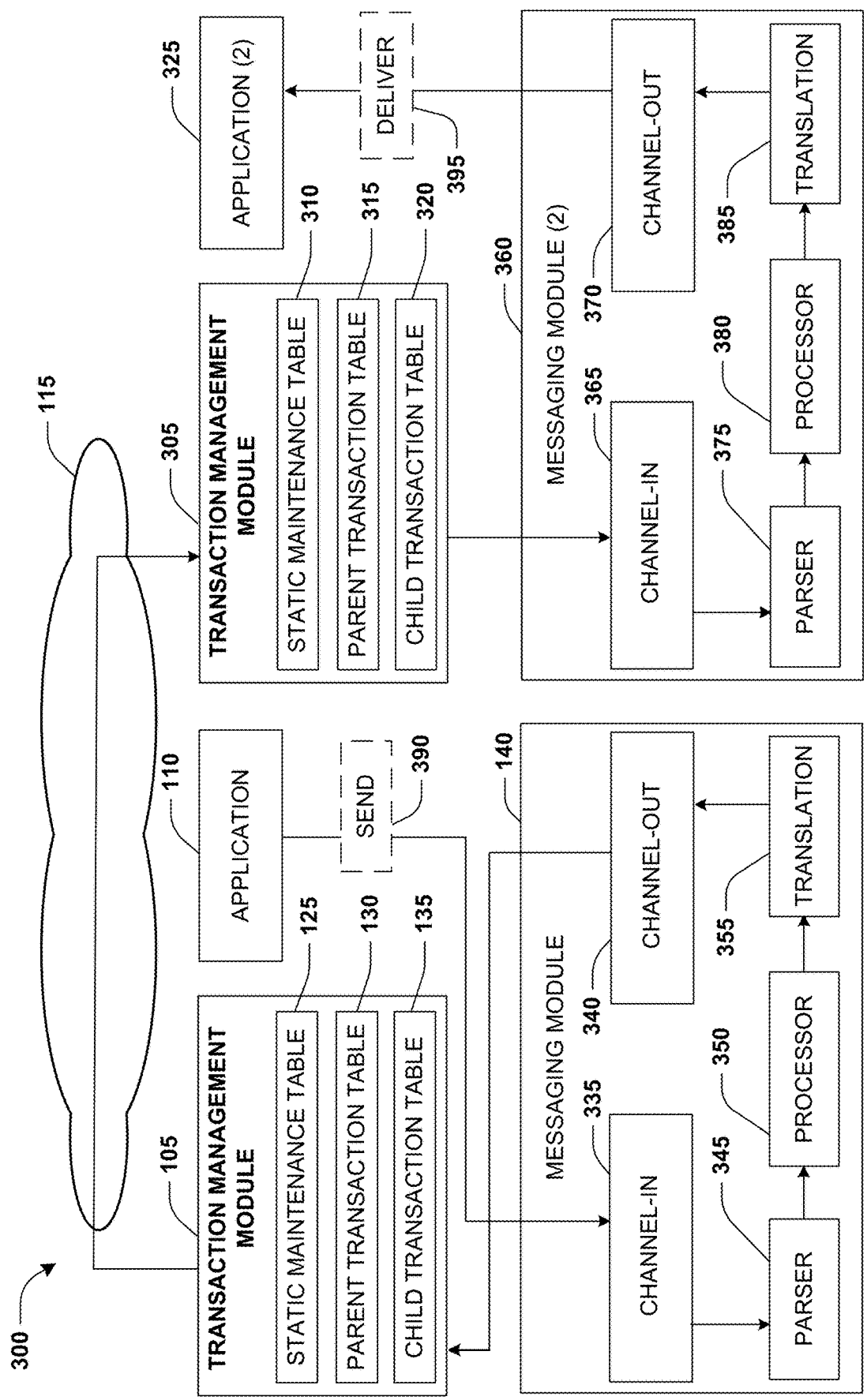
FIG. 3A illustrates an embodiment of a system associated with managing transactions communicated over a blockchain network, where a message associated with a transaction is transmitted from an application to a second application.

At 205, the transaction management module 105 maintains the static maintenance table 125 populated with hardcoded properties of a first entity, such as a first bank, as illustrated by example system 300 of FIG. 3A. The hardcoded properties can comprise a host name of a computing device associated with the first bank, a proxy, an identifier of the first bank, a REST/URL, and/or other properties of the first bank. Similarly, a second transaction management module 305 associated with a second entity, such as a second bank, may maintain a second static maintenance table 310 of hardcoded properties of the second entity.

At 210, the transaction management module 105 maintains the parent transaction table 130 comprising columns of data that are updated less than a threshold frequency. Similarly, the second transaction management module 305 maintains a second parent transaction table 315 comprising columns of data that are updated less than a threshold frequency.

At 215, the transaction management module 105 maintains the child transaction table 135 comprising columns of data that are updated greater than a threshold frequency. Similarly, the second transaction management module 305 maintains a second child transaction table 320 comprising columns of data that are updated greater than a threshold frequency.

In one embodiment, a message associated with a transaction is received by the messaging module 140 from the application 110 that is sending 390 the message for delivery 395 to a second application 325 through a blockchain network 115. In one embodiment, the message may be related to a transaction between a first bank and a second bank, and thus is being transmitted from the application 110 of the first bank over the blockchain network 115 to the second application 325 of the second bank. The message is received through a channel-in interface 335 according to a channel configuration (e.g., a selection and implementation of communication functionality used by the application 110). A parser component 345 uses parser configuration to parse the message into a message object for further processing.

A processor component 350 uses a processor configuration to process the message object using validation and logic, such as to ensure that a source bank and destination bank of the transaction are valid. A translation component 355 uses a translation configuration to format the message into a formatted message having a format used by a destination, such as the transaction management module 105. The formatted message is routed through the channel-out interface 340 to the transaction management module 105 according to a channel configuration (e.g., a selection and implementation of communication functionality used by the transaction management module 105).

At 220, the transaction is received by the transaction management module 105. At 225, the transaction is validated using the hardcoded properties within the static maintenance table 125. At 230, values are populated into columns of the parent transaction table 130 and/or the child transaction table 135 according to an order of arguments of the transaction as specified by the message. At 235, the parent transaction table 130, the child transaction table 135, and/or the static maintenance table 125 are used to route the transaction, such as the formatted message, over the blockchain network 115 to the second transaction management module 305 that may receive, process, and route the transaction to a second messaging module 360 using the second static maintenance table 310, the second parent transaction table 315, and/or the second child transaction table 320. In this way, the second transaction management module 305 receives the formatted message as a routed message. The second messaging module 360 receives the routed message from the second transaction management module 305 through a second channel-in interface 365 according to a channel configuration (e.g., a selection and implementation of communication functionality used by the second transaction management module 305).

A second parser component 375, a second processor component 380, and a second translation component 385 of the second messaging module 360 process the routed message to create a formatted message. The formatted message is routed through a second channel-out interface 370 for delivery 395 to the second application 325 according to a channel configuration (e.g., a selection and implementation of communication functionality used by the second application 325).

Figure 3B:
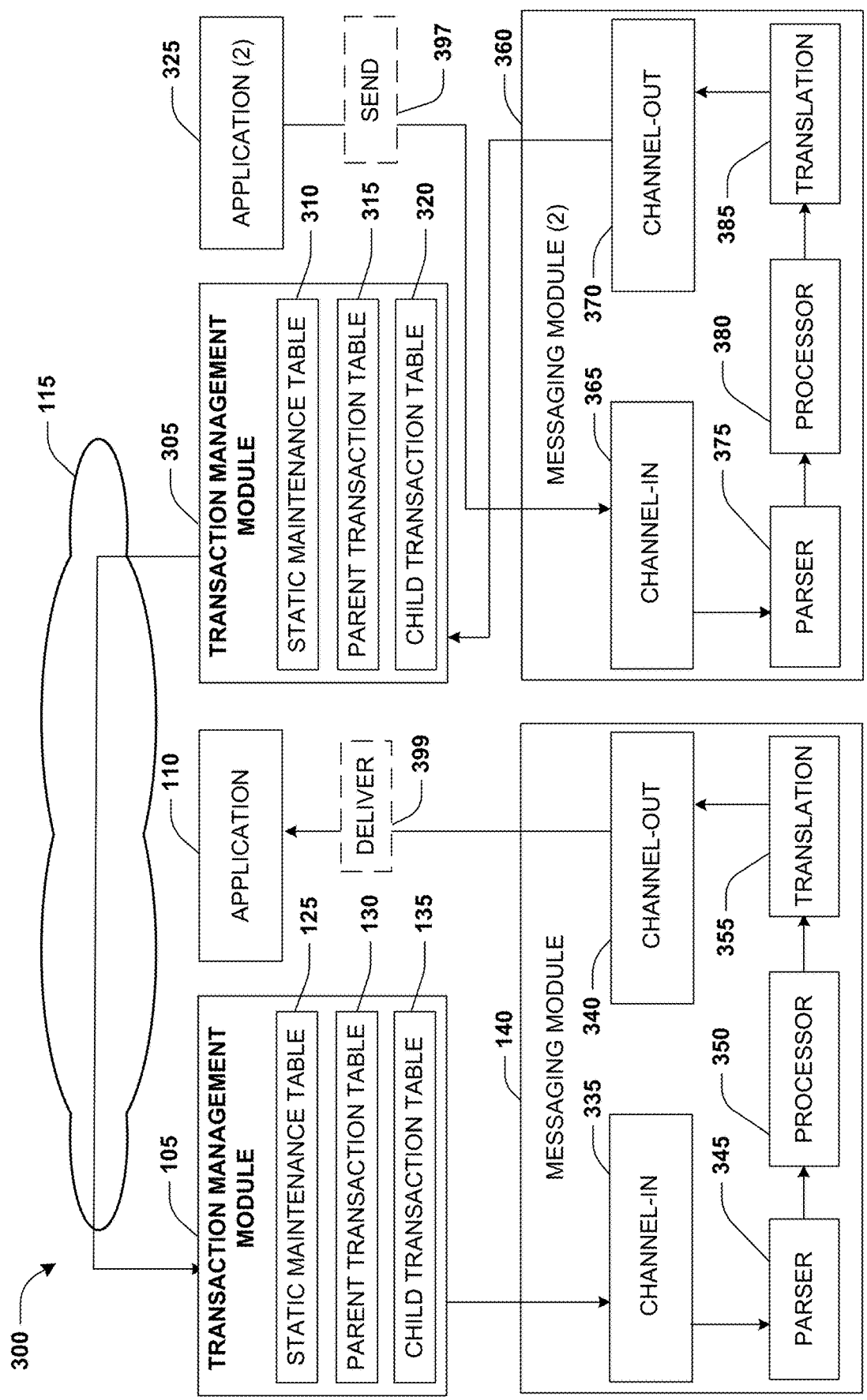
FIG. 3B illustrates an embodiment of a system associated with managing transactions communicated over a blockchain network, where an application receives a message associated with a transaction from a second application.

FIG. 3B illustrates the second application 325 sending 397 a second message for delivery 399 to the application 110. The second messaging module 360 receives the second message through the channel-in interface 365 according to the channel configuration (e.g., a selection and implementation of communication functionality used by the second application 325). The second parser component 375, the second processor component 380, and the second translation component 385 of the second messaging module 360 process the second message to create a second formatted message. The second formatted message is routed through the channel-out interface 370 according to the channel configuration to the second transaction management module 305 (e.g., a selection and implementation of communication functionality used by the second transaction management module 305).

The second transaction management module 305 utilizes the second static maintenance table 310, the second parent transaction table 315, and/or the second child transaction table 320 to receive, process, and/or route a second transaction associated with the second message over the blockchain network 115. The second transaction management module 305 routes the second formatted message over the blockchain network 115 to the transaction management module 105. In this way, the transaction management module 105 receives the second formatted message as a second routed message. The messaging module 140 receives the second routed message from the transaction management module 105 through the channel-in interface 335 according to the channel configuration (e.g., a selection and implementation of communication functionality used by the transaction management module 105).

The parser component 345, the processor component 350, and the translation component 355 of the messaging module 140 process the second routed message to create a second formatted message. The second formatted message is routed through the channel-out interface 340 for delivery 399 to the application 110 according to a channel configuration (e.g., a selection and implementation of communication functionality used by the application 110).

Figure 4:
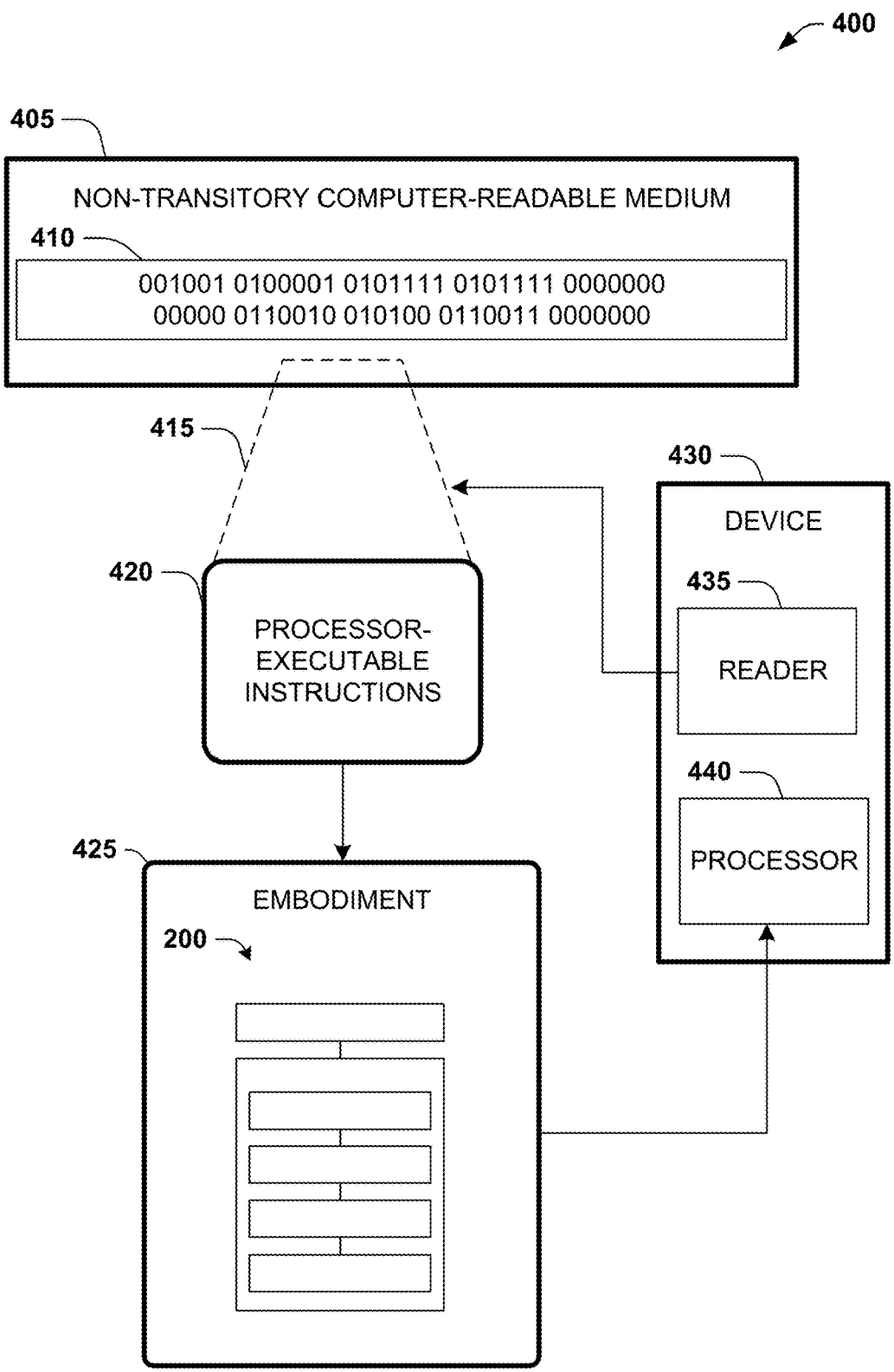
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the transaction management module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the transaction management module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1A, for example.

Figure 5:
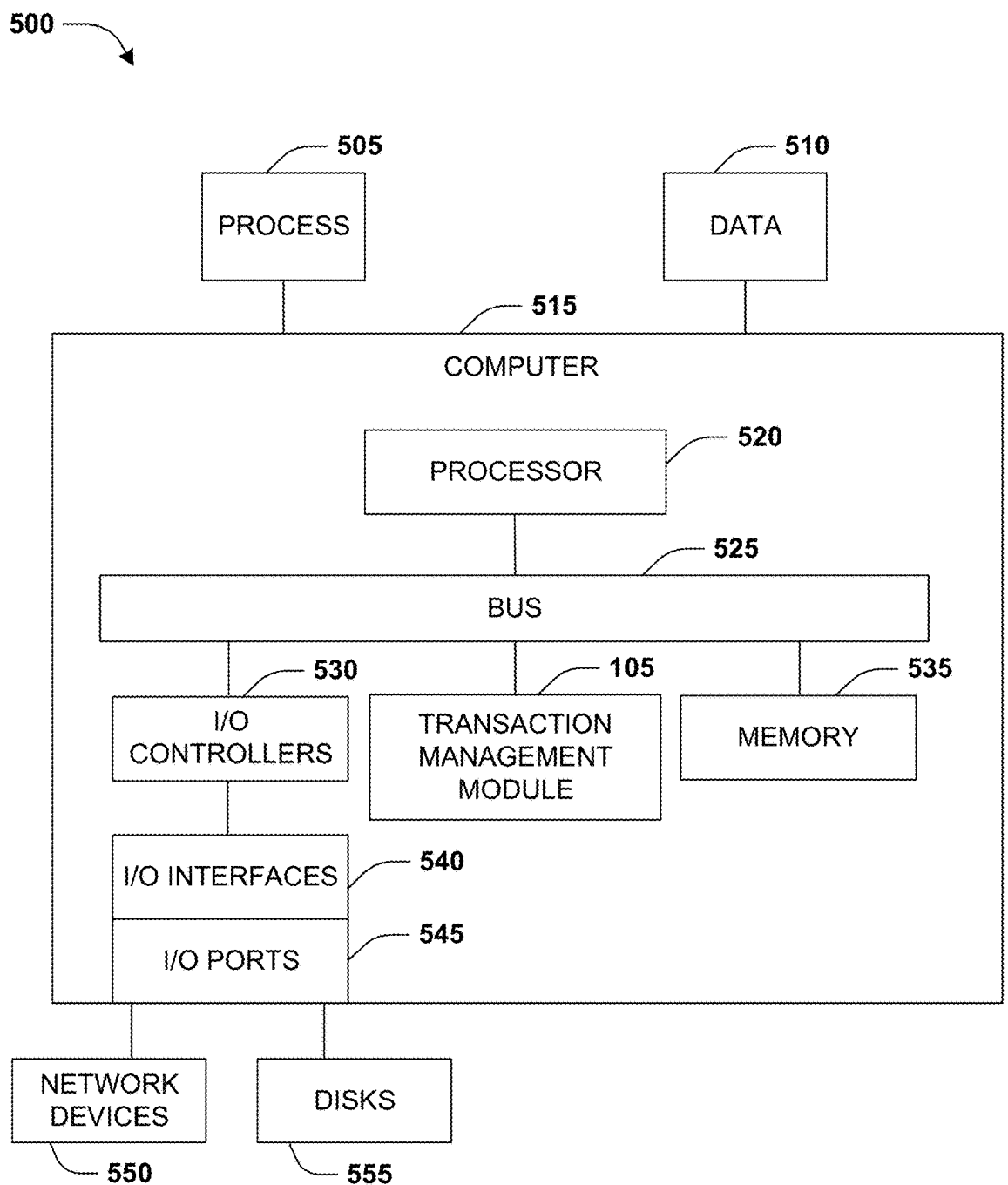
FIG. 5 illustrates an embodiment of a computing system configured with the example systems and/or methods disclosed.

FIG. 5 illustrates an example computing device 500 that is configured and/or programmed with one or more of the example systems and methods described herein, and/or equivalents. The example computing device 500 may be the computer 515 that includes a processor 520, a memory 535, and I/O ports 545 operably connected by a bus 525. In one embodiment, the, the computer 515 may include logic of the transaction management module 105 configured to facilitate the system 100 and/or the method 200 shown in FIGS. 1-2. In different embodiments, the logic of the transaction management module 105 may be implemented in hardware, a non-transitory computer-readable medium 505 with stored instructions, firmware, and/or combinations thereof. While the logic of the transaction management module 105 is illustrated as a hardware component attached to the bus 525, it is to be appreciated that in other embodiments, the logic of the transaction management module 105 could be implemented in the processor 520, stored in memory 535, or stored in disk 555.

In one embodiment, logic of the transaction management module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the transaction management module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multiprocessor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

Figure 6:
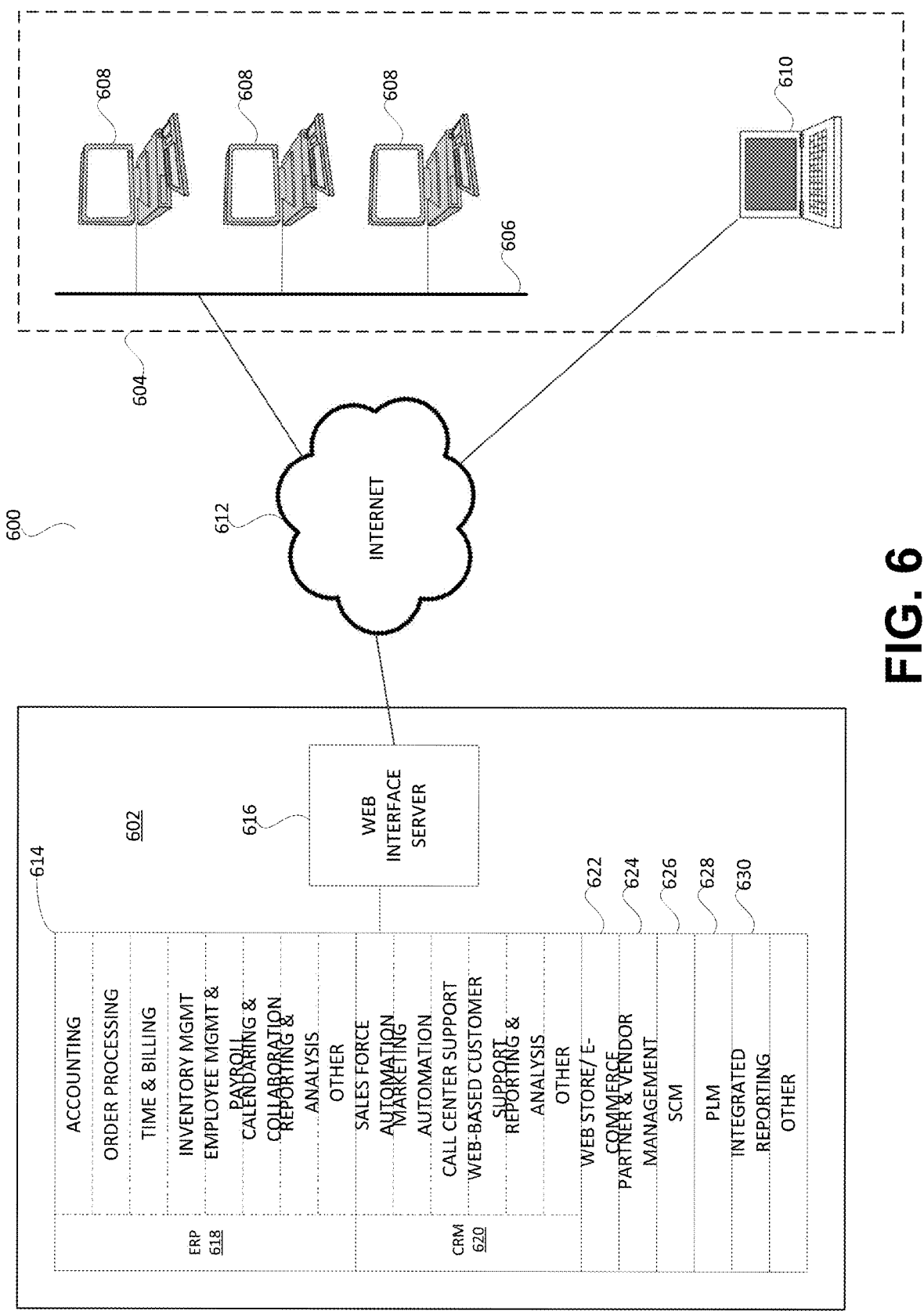
FIG. 6 illustrates an embodiment of an integrated business system and an enterprise network in which an embodiment of the invention may be implemented.

FIG. 6 is a diagram illustrating a system 600 in which an embodiment of the invention may be implemented. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and security module, and other ERP-related modules. The CRM module 620 may include, but is not limited to, a sales force automation (SFA) module, a marketing automation module, a contact list module (not shown), a call center support module, a web-based customer support module, a reporting and security module, and other CRM-related modules. The integrated business server 614 (or multi-tenant data processing platform) further may provide other business functionalities including a web store/eCommerce module 622, a partner and vendor management module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 7:
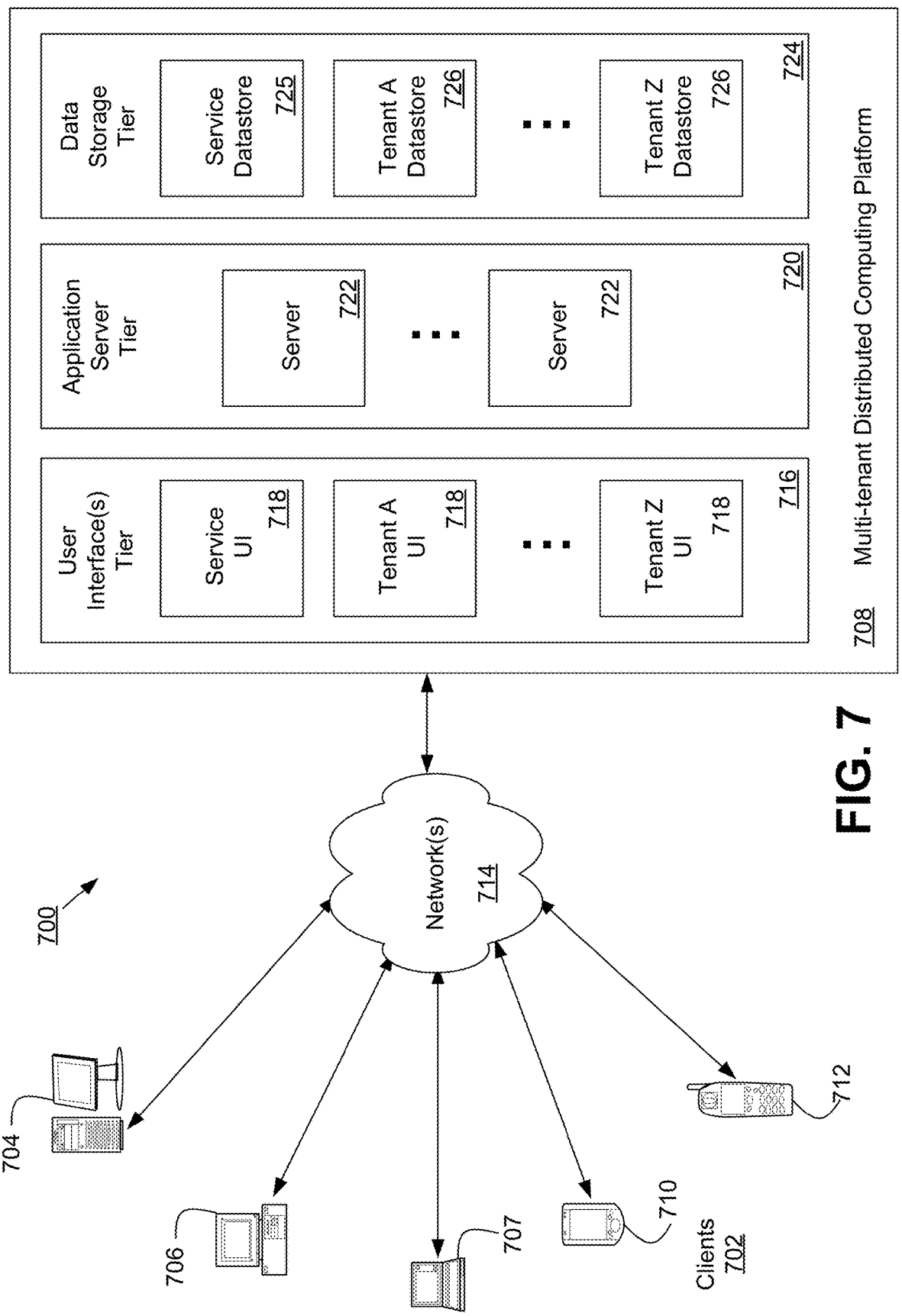
FIG. 7 illustrates an embodiment of a multi-tenant distributed computing service platform.

FIG. 7 is a diagram illustrating elements or components of an example operating environment 700 in which an embodiment of the invention may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices. Examples of suitable computing devices include personal computers, server computers 704, desktop computers 706, laptop computers 707, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers. Examples of suitable networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 718, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 722 that are part of the platform's Application Server Tier 720.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform.

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described.

Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computer causes the processor to:
    maintain a static maintenance table comprising hardcoded properties of a first entity, wherein a hardcoded property comprises at least one of a host name, a proxy, an entity identifier, or a representational state transfer (REST) uniform resource locator (URL);
    maintain a parent transaction table comprising columns of data that are updated less than a threshold frequency, wherein the parent transaction table comprises a primary parent key and a primary child key;
    maintain a child transaction table comprising columns of data that are updated greater than the threshold frequency, wherein the child transaction table comprises the primary parent key, the primary child key, and a name of the parent transaction table;
    receive a transaction to communicate between a first computing device of the entity and a second computing device of a second entity over a block chain network;
    validate the transaction using the hardcoded properties within the static maintenance table;
    populate values into columns of the parent transaction table and the child transaction table according to an order of arguments of the transaction; and
    utilize the parent transaction table and the child transaction table to facilitate the communication of the transaction over the block chain network to the second computing device.

2. The non-transitory computer-readable medium of claim 1, wherein the instructions comprise instructions to:
    utilize a table object file to create the static maintenance table, the parent transaction table, and the child transaction table using table structure information within the table object file.

3. The non-transitory computer-readable medium of claim 1, wherein the instructions comprise instructions to:
    execute a function to add a hardcoded property into the static maintenance table.

4. The non-transitory computer-readable medium of claim 1, wherein the instructions comprise instructions to:
    execute a function to update a hardcoded property into the static maintenance table.

5. The non-transitory computer-readable medium of claim 1, wherein the instructions comprise instructions to:
    execute a function to disable a hardcoded property; and
    in response to a determination that the hardcoded property is used, enable the hardcoded property.

6. The non-transitory computer-readable medium of claim 1, wherein the instructions comprise instructions to:

query the static maintenance table to identify a set of hardcoded properties used to communicate with the second entity over the block chain network; and transmit the transaction over the block chain network using the set of hardcoded properties.

7. The non-transitory computer-readable medium of claim 1, wherein the instructions comprise instructions to:

store a transaction identifier of the transaction as the primary parent key based upon the transaction being an initial transaction.

8. The non-transitory computer-readable medium of claim 7, wherein the instructions comprise instructions to:

store a current transaction identifier of a current transaction as the primary child key.

9. A computing system, comprising:

a processor connected to memory; and a transaction management module stored on a non-transitory computer readable medium and configured with instructions that when executed by the processor cause the processor to:

maintain a static maintenance table comprising hardcoded properties of a first entity, wherein a hardcoded property comprises at least one of a host name, a proxy, an entity identifier, or a representational state transfer (REST) uniform resource locator (URL);

maintain a parent transaction table comprising columns of data that are updated less than a threshold frequency, wherein the parent transaction table comprises a primary parent key and a primary child key;

maintain a child transaction table comprising columns of data that are updated greater than the threshold frequency, wherein the child transaction table comprises the primary parent key, the primary child key, and a name of the parent transaction table;

receive a transaction to communicate between a first computing device of the entity and a second computing device of a second entity over a block chain network;

validate the transaction using the hardcoded properties within the static maintenance table;

populate values into columns of the parent transaction table and the child transaction table according to an order of arguments of the transaction; and utilize the parent transaction table and the child transaction table to facilitate the communication of the transaction over the block chain network to the second computing device.

10. The computing system of claim 9, wherein the instructions comprise instructions that cause the processor to:

populate at least one of the parent transaction table and the child transaction table with a status column used to store a status of the transaction.

11. The computing system of claim 9, wherein the instructions comprise instructions that cause the processor to:

populate at least one of the parent transaction table and the child transaction table with a destination entity column used to track a destination of transactions and a source entity column used to track a source of transactions.

12. The computing system of claim 9, wherein the instructions comprise instructions that cause the processor to:

execute a function to update the transaction by:

validating a number of arguments of the update by iterating through a table object file to determine a number of columns within the parent transaction table and the child transaction table; and in response to validating the number of arguments as corresponding to the number of columns, implementing the update by iterating through the parent transaction table and the child transaction table to insert values according to an order of the arguments.

13. The computing system of claim 9, wherein the instructions comprise instructions that cause the processor to:

receive a request for the transaction;

query the child transaction table using the child primary key to access data of the transaction and the parent primary key; and query the parent transaction table using the parent primary key to access data of the transaction.

14. The computing system of claim 13, wherein the child primary key comprises a current transaction identifier.

15. The computing system of claim 9, wherein the instructions comprise instructions that cause the processor to:

maintain an array list of failed transactions; and in response to a threshold amount of time occurring since a last transaction communication attempt for a failed transaction within the array list, attempt to transmit the failed transaction across the block chain network.

16. A computer-implemented method, the computer-implemented method involving a computing device comprising a processor, and the computer-implemented method comprising:

maintaining, by the processor, a static maintenance table comprising hardcoded properties of a first entity, wherein a hardcoded property comprises at least one of a host name, a proxy, an entity identifier, or a representational state transfer (REST) uniform resource locator (URL);

maintaining, by the processor, a parent transaction table comprising columns of data that are updated less than a threshold frequency, wherein the parent transaction table comprises a primary parent key and a primary child key;

maintaining, by the processor, a child transaction table comprising columns of data that are updated greater than the threshold frequency, wherein the child transaction table comprises the primary parent key, the primary child key, and a name of the parent transaction table;

receiving, by the processor, a transaction to communicate between a first computing device of the entity and a second computing device of a second entity over a block chain network;

validating, by the processor, the transaction using the hardcoded properties within the static maintenance table;

populating, by the processor, values into columns of the parent transaction table and the child transaction table according to an order of arguments of the transaction; and utilizing, by the processor, the parent transaction table and the child transaction table to facilitate the communication of the transaction over the block chain network to the second computing device.

17. The computer-implemented method of claim 16, further comprising:

receiving an insert transaction request of a current transaction;

querying the parent transaction table using a transaction identifier of the current transaction to fetch data of the current transaction;

sending a full message of the current transaction to the destination computing device over the block chain network;

in response to the data of the current transaction comprising a value indicating that the source computing device is to be notified, sending a short message to the source computing device over the block chain network; and in response to the data of the current transaction comprising a second value indicating that the source computing device is not to be notified, refraining from sending the short message to the source computing device over the block chain network.

18. The computer-implemented method of claim 16, further comprising:

receiving an insert transaction request of a current transaction;

querying the parent transaction table using a transaction identifier of the current transaction to fetch data of the current transaction;

sending a full message of the current transaction to the destination computing device over the block chain network;

in response to the data of the current transaction comprising a value indicating that the source computing device is to be notified, sending a short message to the source computing device over the block chain network; and in response to the data of the current transaction comprising a second value indicating that the source computing device is not to be notified, refraining from sending the short message to the source computing device over the block chain network.

19. The computer-implemented method of claim 16, further comprising:

receiving an update transaction request of a current transaction;

querying the parent transaction table using a transaction identifier of the current transaction to fetch data of the current transaction;

in response to the data of the current transaction comprising a value indicating that the source computing device is to be notified, sending a short message to the source computing device over the block chain network otherwise refraining from sending the short message; and in response to the data of the current transaction comprising a value indicating that the destination computing device is to be notified, sending a second short message to the destination computing device over the block chain network otherwise refraining from sending the second short message.

20. The computer-implemented method of claim 16, wherein the first computing device is associated with a first bank, the second computing device is associated with a second bank, and the transaction is between the first bank and the second bank.

* * * * *